United States Patent
Leib (10) Patent No.: US 12,398,273 B2
(45) Date of Patent: Aug. 26, 2025

(54) SILOXANE-FUNCTIONALIZED SILICA

(71) Applicant: Wacker Chemie AG, Munich (DE)

(72) Inventor: Elisabeth Leib, Munich (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 18/276,660

(22) PCT Filed: Mar. 5, 2021

(86) PCT No.: PCT/EP2021/055602
§ 371 (c)(1),
(2) Date: Aug. 10, 2023

(87) PCT Pub. No.: WO2022/184271
PCT Pub. Date: Sep. 9, 2022

(65) Prior Publication Data
US 2024/0132726 A1    Apr. 25, 2024

(51) Int. Cl.
| | | |
|---|---|---|
| C08G 77/18 | (2006.01) |
| C08G 77/00 | (2006.01) |
| C08G 77/26 | (2006.01) |
| C09C 1/30 | (2006.01) |
| G03G 9/097 | (2006.01) |

(52) U.S. Cl.
CPC ............ *C09C 1/3081* (2013.01); *C08G 77/18* (2013.01); *C08G 77/26* (2013.01); *C08G 77/70* (2013.01); *G03G 9/09716* (2013.01); *G03G 9/09725* (2013.01); *C01P 2006/12* (2013.01); *C01P 2006/22* (2013.01)

(58) Field of Classification Search
USPC .......................................................... 528/10
See application file for complete search history.

(56) References Cited

U.S. PATENT DOCUMENTS

| | | | |
|---|---|---|---|
| 4,193,885 A | 3/1980 | Halm |
| 4,902,499 A | 2/1990 | Bolish, Jr. et al. |

FOREIGN PATENT DOCUMENTS

| CN | 1155562 A | 7/1997 |
|---|---|---|
| DE | 102006017592 A1 | 10/2007 |
| EP | 0251176 A2 | 1/1988 |
| EP | 0495676 A1 | 7/1992 |
| EP | 0686676 A1 | 12/1995 |
| EP | 0926210 A1 | 6/1999 |
| EP | 1205505 A2 | 5/2002 |
| EP | 1580215 A1 | 9/2005 |
| EP | 3153518 A1 | 4/2017 |
| JP | 11021289 A | 1/1999 |
| JP | 2018520968 A | 8/2018 |
| JP | 2019019019 A | 2/2019 |
| RU | 2221826 C1 | 1/2004 |
| WO | 1996018670 A1 | 6/1996 |
| WO | 2010103103 A1 | 9/2010 |
| WO | 2016124439 A1 | 8/2016 |
| WO | 2017058713 A1 | 4/2017 |
| WO | 2018141383 A1 | 8/2018 |
| WO | 2018184668 A1 | 10/2018 |

OTHER PUBLICATIONS

Sears et al. "Determination of Specific Surface Area of Colloidal Silica by Titration with Sodium Hydroxide". Analytical Chemistry, vol. 28, No. 12, 1956, pp. 1981-1983.

*Primary Examiner* — Terressa Boykin (57) ABSTRACT

A silica functionalized with a siloxane is of the general formula (I), $[SiO_{4/2}]_a[R^1SiO_{3/2}]_b [R^3R^1SiO_{2/2}]_c[R^1_3SiO_{1/2}]_d[O_{1/2}R^2]_e$ (I). The indices a, b, c, d, e each independently have integer values a from 0 to 100, b from 0 to 100, c from 0 to 50, d from 3 to 200, e from 0 to 50, with the proviso that the sum of a, b and c is at least 1 and for more than 50% of the siloxanes in the mixture the sum of a, b and c is $\geq 4$.

13 Claims, 1 Drawing Sheet

SILOXANE-FUNCTIONALIZED SILICA

CROSS-REFERENCE TO RELATED APPLICATIONS

This application is a U.S. National Phase Application of PCT/EP2021/055602, filed Mar. 5, 2021, the entire disclosure of which is hereby incorporated by reference.

BACKGROUND

The invention relates to silicas, functionalized with a siloxane free from [Me$_2$SiO$_{2/2}$] units of the general formula (I) and to a process for producing such silicas.

Siloxanes are an industrially important compound class that is used in numerous fields of technology. The preparation of siloxanes is an important process in industrial organosilicon chemistry. By way of example, one process that has become established on an industrial scale is the hydrolytic condensation starting from chlorosilanes according to the following reaction equation:

Another process that has become established is the hydrolytic condensation of alkoxy group-containing silanes and siloxanes, which are each raw materials produced on an industrial scale:

Fumed silicas are widely used additives for controlling the flow properties of, for example, adhesives, sealants and coating materials such as paints or varnishes. They are used in particular to adjust viscosity, shear-diluting and thixotropic properties, and the yield point.

Unfunctionalized silicas are commonly used for non-polar, higher molecular weight systems having a high solvent content.

For polar, low molecular weight systems having a low solvent content or solvent-free systems, hydrophobic silicas are generally used. Hydrophobization can be carried out, for example, by functionalization with polyorganosiloxanes (for example polydimethylsiloxane, PDMS) or chloroalkylsilanes (especially chloromethylsilanes), wherein the silicas functionalized in this way have mono-, di- or trimethylsiloxy groups.

The nomenclature of polyorganosiloxanes (abbr: siloxanes) is based on the functionality of the units thereof. There are four different units (building blocks): mono-, di-, tri- and tetra-functional (M, D, T, Q). M-siloxanes act as chain ends. D-siloxanes are generally used to build linear chains and cyclic siloxanes. T- and Q-siloxanes are used to crosslink chains and build branched and hyperbranched networks.

Cyclic siloxanes may be formed when producing siloxanes using difunctional synthetic units. If silicas are then functionalized with these siloxanes, they also comprise cyclic siloxanes.

Siloxanes comprising [Me$_2$SiO$_{2/2}$] units give rise in particular to cyclic D-siloxanes such as hexamethylcyclotrisiloxane (D3, [Me$_2$SiO$_{2/2}$]$_3$), octamethylcyclotetrasiloxane (D4, [Me$_2$SiO$_{2/2}$]$_4$), decamethylcyclopentasiloxane (D5 or [Me$_2$SiO$_{2/2}$]$_5$) and dodecamethylcyclohexasiloxane (D6 or [Me$_2$SiO$_{2/2}$]$_6$) and higher homologs. In the European Union, D4, D5 and D6 meet the requirements according to Regulation (EC) No 1907/2006 (REACH Regulation) to be classified as vPvB (very persistent, very bioaccumalative), PBT (persistent, bioaccumulative, toxic) and ultimately SVHC (substances of very high concern). The REACH regulation initially required a reduction in content of these D-cycles to below 1000 ppm. In the 15th amendments to the regulation, the limit was then lowered to 250 ppm. As a result, processes were established in which D-siloxanes having a low D-cycle content can be produced, either by removing these cycles by distillation or by targeted chemical conversions.

WO 96/18670 A1 describes a process for producing a substantially cycle-free polyorganosiloxane mixture in which cycle formation is suppressed by adding an equilibration catalyst. The polyorganosiloxane mixtures can also be functionalized.

EP 1 580 215 B1 describes a process for producing amino-functional organosiloxanes having a low D4 content.

The use of T and Q units in combination with D-siloxanes is also known. For instance, U.S. Pat. No. 4,193,885 describes the use of branched methylpolysiloxanes as heat transfer media, where the content of T and Q units is preferably less than 10 mol %.

The formation of D-cycles can be completely ruled out if the use of the D-unit (Me$_2$SiO$_{2/2}$) is omitted.

Processes for producing D-free siloxanes have so far been limited to low-molecular weight TM systems (systems consisting only of T and M units) or QM systems and mainly relate to the applications thereof as heat transfer fluids and in cosmetics.

WO 2010/103103 A1 describes the use of polyorganosiloxanes as power and/or heat transfer fluids, also allowing T and Q units and thus both pure TM and QM systems. One of the Si-bonded radicals has at least two carbon atoms.

RU 2 221 826 C1 relates, inter alia, to the use of TM3 [(Me)Si(OSiMe$_3$)$_3$] as a component of heat transfer fluids in mixtures with linear DM siloxanes.

WO 2016/124439 A1 describes the use of QM4 [Si(OSiMe$_3$)$_4$] as heat transfer fluid.

WO 2017/058713 A1 describes the use of TM3 and QM4 as components of a composition for skin care applications.

Processes for producing QM and TM systems are also known.

EP 1 205 505 A2 and EP 0 495 676 A1 describe processes for producing alkoxy-rich TM oligomers and polymers respectively, which may comprise Q units and unsaturated functionalities. WO 2018/141383 A1 describes a continuous process for producing QM4, Q(VM2)4 [Si(OSi(Me)$_2$(C(H)=CH$_2$))$_4$] and TM3.

Other processes enable the generation of low molecular weight QM or TM systems, equipped with unsaturated or amino functionalities.

JP11021289 A2 describes a process for producing 3-aminopropyl-substituted TM3 and QM4, while EP 3 153 518 A1 relates to processes for producing monovinylated TM3 and QM4.

An alternative process for generating (including also linear) TM siloxanes by silylation of alkali metal silanolates is described in WO 2018/184668 A1. However, stoichiometric amounts of alkali metal salts are produced in this case.

The functionalization of silicas with M-, D-, and/or T-groups is known. This usually proceeds as a condensation reaction between the silanol groups of the silica and the M, D, and/or T units (R$_n$SiX, where X is a reactive leaving group and n=1, 2 or 3) of the siloxane or organosilane.

For example, EP 0 686 676 A1 describes a process for silylating silica with M-, D-, and/or T-siloxanes. The siloxane is added to the silica in the form of a finely atomized aerosol.

EP 0 926 210 A1 and DE 10 2006 017 592 A1 each describe processes for the hydrophobization of silicas with organomonosilanes, wherein the silica is functionalized with M, D, and/or T groups.

A disadvantage of the aforementioned processes for the functionalization of silicas is that these may comprise D-cycles.

The object of the invention was to provide hydrophobic silicas that are essentially free of D-cycles.

BRIEF SUMMARY

Embodiments of a silica functionalized with a siloxane are provided. In an embodiment, the silica functionalized with a siloxane is of the general formula (I), $[SiO_{4/2}]_a [R^1SiO_{3/2}]_b [R^3R^1SiO_{2/2}]_c [R^1{}_3SiO_{1/2}]_d [O_{1/2}R^2]_e$ (I), where the indices a, b, c, d, e each independently have integer values a from 0 to 100, b from 0 to 100, c from 0 to 50, d from 3 to 200, e from 0 to 50, with the proviso that the sum of a, b and c is at least 1 and for more than 50% of the siloxanes in the mixture the sum of a, b and c is ≥4. In this embodiment, $R^1$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical, $R^2$ is each independently H, an unsubstituted or substituted $C_1$-$C_{20}$-hydrocarbon radical, and $R^3$ is each independently H, an amino group, unsubstituted or substituted $C_2$-$C_{20}$-alkyl radical, unsubstituted or substituted $C_2$-$C_{20}$-alkenyl radical, unsubstituted or substituted $C_6$-$C_{14}$-aryl radical, wherein substituted signifies that independently of one another at least one substituent is present from the group of $OR^Y$, —$NR^Y{}_2$, —SH, —$SR^Y$, epoxy, —$COOR^Y$, —CHO, —CN, —NCO, —$OCOOR^Y$, —$NR^Y$—$COOR^Y$, —$NR^Y$—CO—$NR^Y$, —$SiR^Y{}_3$ and —$OSiR^Y{}_3$, where $R^Y$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

Essentially should be understood to mean in this case that at least the detection limit for D-cycles of the analytical method used here of 60 ppm is not reached.

This object is achieved by a silica functionalized with a siloxane of the general formula (I)

$$[SiO_{4/2}]_a[R^1SiO_{3/2}]_b[R^3R^1SiO_{2/2}]_c[R^1{}_3SiO_{1/2}]_d[O_{1/2}R^2]_e \quad (I)$$

where the indices a, b, c, d, e each independently have integer values
a from 0 to 100,
b from 0 to 100,
c from 0 to 50,
d from 3 to 200,
e from 0 to 50,
with the proviso that the sum of a, b and c is at least 1 and for more than 50% of the siloxanes in the mixture the sum of a, b and c is ≥4;
where $R^1$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical;
where $R^2$ is each independently H, an unsubstituted or substituted $C_1$-$C_{20}$-hydrocarbon radical;
where $R^3$ is each independently H, an amino group, unsubstituted or substituted $C_2$-$C_{20}$-alkyl radical, unsubstituted or substituted $C_2$-$C_{20}$-alkenyl radical, unsubstituted or substituted $C_6$-$C_{14}$-aryl radical, wherein substituted signifies that independently of one another at least one substituent is present from the group of $OR^Y$, —$NR^Y{}_2$, —SH, —$SR^Y$, epoxy, —$COOR^Y$, —CHO, —CN, —NCO, —$OCOOR^Y$, —$NR^Y$—$COOR^Y$, —$NR^Y$—CO—$NR^Y$, —$SiR^Y{}_3$ and —$OSiR^Y{}_3$, where $R^Y$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical.

Preferably, the indices a, b, c, d, e each independently have the following integer values:
a from 0 to 30,
b from 0 to 30,
c from 0 to 15,
d from 3 to 60 and
e from 0 to 15.

The siloxane preferably has no Q units and the index a has the value 0. In other words, the functionalized silica preferably does not have any Q groups as functionalization.

The siloxane preferably has no D units and the index c has the value 0. In other words, the functionalized silica preferably does not have any D groups as functionalization.

The content of D-cycles is preferably less than 250 ppmw, particularly preferably less than 150 ppmw, especially less than 60 ppmw. The D-cycle content can be determined with the aid of a gas chromatograph equipped with a flame ionization detector (GC-FID). The detection limit here is usually 60 ppmw (cf. point 8 of the measurement methods). In general, the D-cycle content should be close to 0 or at 0 ppmw, since the siloxane used for functionalization is generally free of D-cycles and the reaction conditions during functionalization do not generally favor the formation of D-cycles.

The functionalized silica preferably has a surface area (measured by the BET method according to DIN 66131 and 66132) of 30 to 400 m²/g, particularly preferably of 40 to 300 m²/g, especially of 50 to 200 m²/g.

The silanol group content (residual silanol content relative to the starting silica) of the functionalized silica is preferably 15 to 45% (cf. point 9 of the measurement methods).

The carbon content of the functionalized silica is preferably 1 to 10% (cf. point 10 of the measurement methods).

The content of volatile components of the functionalized silica at 300° C. is preferably 0.5 to 10%, particularly preferably 2 to 8%, especially 3 to 7%.

The content of volatile components of the functionalized silica at 105° C. is preferably 0.1 to 0.5%, particularly preferably 0.2 to 0.3% (cf. point 11 of the measurement methods).

The thickening effect of the functionalized silica is preferably 1 to 10 mPas, particularly preferably 2 to 9 mPas, especially 3 to 8 mPas (cf point 12 of the measurement methods).

Another aspect of the invention relates to a process for producing a functionalized silica, in particular a silica as described above, by reacting an unfunctionalized silica with a siloxane of the general formula (I)

(1)

where the indices a, b, c, d, e each independently have integer values (the proviso described above applies)
a from 0 to 100,
b from 0 to 100,
c from 0 to 50,
d from 3 to 200 and
e from 0 to 50,
with the proviso that the sum of a, b and c is at least 1 and for more than 50% of the siloxanes in the mixture the sum of a, b and c is ≥4, the radicals $R^1$, $R^2$, $R^3$ are as defined above and wherein the alkoxy group content ($R^2 \neq H$) is less than 5 mol % and the silanol group content ($R^2 = H$) is less than 500 ppm and the siloxane has a viscosity of 5 to 500 000 mPa*s.

Preferably, the indices a, b, c, d, e each independently have the following integer values:
a from 0 to 30,
b from 0 to 30,
c from 0 to 15,
d from 1 to 60 and
e from 0 to 15,
where the alkoxy group content is less than 1% by weight and the silanol group content is less than 350 ppm and the siloxane has a viscosity of 60 to 10 000 mPa*s, especially 50 to 500 mPa*s.

The viscosity (at 25° C.) of the siloxane usually changes by less than 10%, especially less than 5%, over a storage period of 4 weeks at 25° C. Furthermore, the siloxane is generally hydrophobic and immiscible with water under standard conditions (25° C. and 1.013 bar).

The value of the index a and/or of the index c preferably has the value 0. In particular, the siloxane has no $[R^3R^1SiO_{2/2}]$ units (c=0) and may be referred to as TM, QTM or QM siloxane, depending on its composition. Siloxanes (siloxane mixtures) containing TM, QTM and/or QM siloxanes can be summarized as Q/T/M siloxanes.

In particular, the siloxane used is free from D-cycles.

Preferably, the ratio of the index d to the index b is 0.15 to 3, preferably 0.2 to 2, particularly preferably 0.3 to 1.

Examples of $C_1$-$C_{20}$-alkyl radicals, as which the radicals $R^1$, $R^2$ and $R^3$ of the siloxane may each be independently defined, are:

methyl, ethyl, n-propyl, isopropyl, 1-n-butyl,2-n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals.

Examples of $C_6$-$C_{14}$-aryl radicals may include phenyl, naphthyl, anthryl and phenanthryl radicals.

Examples of aryl radicals may include o-, m-, p-tolyl radicals, xylyl radicals and ethylphenyl radicals; and alkyl radicals, such as the benzyl radical, the α- and the β-phenylethyl radical.

Examples of $C_2$-$C_{20}$-alkenyl radicals may include vinyl, allyl, 5-hexen-1-yl, E-4-hexen-1-yl, Z-4-hexen-1-yl, 2-(3-cyclohexenyl)ethyl and cyclododeca-4,8-dienyl radical.

Examples of amino groups may include:
morpholino-($CH_2$)—,
$H_2N(CH_2)_2NH(CH_2)CH(CH_3)CH_2$—,
(cyclohexyl)$NH(CH_2)_3$—,
(cyclohexyl)$NH(CH_2)$—,
$CH_3NH(CH_2)_3$—,
$(CH_3)_2N(CH_2)_3$—,
$CH_3CH_2NH(CH_2)_3$—,
$(CH_3CH_2)_2N(CH_2)_3$—,
$CH_3NH(CH_2)_2NH(CH_2)_3$—,
$(CH_3)_2N(CH_2)NH(CH_2)_3$—,
$CH_3CH_2NH(CH_2)_2NH(CH_2)_3$—,
$(CH_3CH_2)_2N(CH_2)_2NH(CH_2)_3$.

The radical $R^Y$ is preferably each independently selected from the group comprising 3-aminopropyl, [N-(2-aminoethyl)-3-aminopropyl], methyl, ethyl, propyl, butyl, 2-butyl, tert-butyl, neopentyl, hexyl, vinyl, allyl, hexenyl, phenyl, benzyl, tolyl and naphthyl. In particular, $R^Y$ is selected from the group comprising methyl, ethyl, vinyl, allyl, hexenyl and phenyl.

The $C_1$-$C_{20}$-alkyl radical, the $C_2$-$C_{20}$-alkenyl radical and/or the $C_6$-$C_{14}$-aryl radical of the siloxane used is preferably unsubstituted.

The radical $R^2$ is preferably each independently an unsubstituted $C_1$-$C_{12}$-hydrocarbon radical, particularly preferably a $C_1$-$C_6$-hydrocarbon radical, especially methyl or ethyl.

Preferably, the siloxane used is a substitute for polydimethylsiloxanes (formula A), where $R^1$ is preferably each independently selected from the group comprising methyl, ethyl and phenyl. $R^2$ is preferably each independently selected from the group comprising H, methyl and ethyl and $R^3$ is preferably each independently ethyl or phenyl.

(Formula A)

According to a further embodiment, the siloxane is a substitute for vinylpolysiloxanes. In vinylpolysiloxanes, individual methyl radicals per molecule are substituted by unsaturated functionalities (based on formula A). The radical $R^1$ is preferably each independently selected from the group comprising methyl, ethyl, phenyl, vinyl, allyl and hexenyl. $R^2$ is preferably each independently selected from the group comprising H, methyl and ethyl. $R^3$ is preferably each independently selected from the group comprising ethyl, phenyl, vinyl, allyl and hexenyl.

According to a further embodiment, the siloxane is a substitute for amine oils. Based on formula A, individual methyl radicals in amine oils are replaced by amino groups. The radical $R^1$ is preferably each independently selected from the group comprising methyl, ethyl, phenyl, 3-aminopropyl and [N-(2-aminoethyl)-3-aminopropyl]. $R^2$ is preferably each independently selected from the group of H, methyl and ethyl. $R^3$ is preferably each independently selected from the group comprising ethyl, phenyl, 3-aminopropyl and [N-(2-aminoethyl)-3-aminopropyl].

The unfunctionalized silica preferably has a surface area of 50 to 400 m$^2$/g (BET method, see above).

The unfunctionalized silica is reacted with the siloxane of the general formula (I) preferably at a temperature of 25 to 400° C., particularly preferably 200 to 400° C., especially 200 to 350° C. In particular, this temperature is the temperature of the wall of the reactor used.

The reaction is preferably carried out at standard pressure.

The unfunctionalized silica is preferably treated with 0.5 to 5% (based on the mass of the silica) of a protic solvent or a weak base, preferably ammonia, prior to functionalization.

Also encompassed by the invention is a functionalized silica produced by the process described, and having a content of D-cycles of less than 250 ppmw, preferably less than 150 ppmw, particularly preferably less than 60 ppmw.

Another aspect of the invention relates to the use of the functionalized silicas described as an additive for controlling the rheology of liquid and pulverulent systems, in particular adhesives and sealants, toners and developers.

The siloxanes used for the functionalization having an alkoxy group content [$O_{1/2}R^2$] of less than 3% by weight can be produced by a process comprising the following steps:
a) reacting a mixture comprising at least one silicon compound from the group comprising $R^1_3SiX$, $R^1_3SiOR^2$ and $R^1_3SiOSiR^1_3$ and at least one silicon compound from the group comprising $SiX_4$, $Si(OR^2)_4$, $R^1SiX_3$, $R^1Si(OR^2)_3$, $R^3R^1SiX_2$ and $R^3R^1Si(OR^2)_2$, with a proportion of water that corresponds to at least 50% of the amount of alkoxy groups present in the mixture, optionally in the presence of an alcohol and/or solvent, where X is each independently F, Cl, Br, I, tosylate, triflate or acetate and the radicals $R^1$, $R^2$ and $R^3$ are defined as described above;
b) carrying out a phase separation to separate off a siloxane phase;
c) reacting the siloxane phase with a basic catalyst or with an acidic catalyst, wherein the reaction with the acidic catalyst is carried out in the presence of at least one silicon compound from the group comprising $R^1_3SiOSiR^1_3$, $R^1_3SiX$ and $R^1_3SiOH$;
d) removing low molecular weight constituents to obtain the siloxane.

The mixture in step a) preferably comprises at least one silicon compound from the group comprising $R^1_3SiX$, $R^1_3SiOR^2$ and $R^1_3SiOSiR^1_3$ and at least one silicon compound from the group comprising $SiX_4$, $Si(OR^2)_4$, $R^1SiX_3$ and $R^1Si(OR^2)_3$.

The reaction in step a) is a cohydrolysis, wherein said reaction is carried out with an excess of water (based on the amount of water required to hydrolyze the alkoxy functionalities present). This process variant (cf. FIG. 1, variant A) may be carried out in the presence of an alcohol and/or a solvent, the alcohol preferably being a monohydric or dihydric $C_1$-$C_{20}$-alcohol. Particular preference is given to a monohydric unbranched $C_1$-$C_6$-alcohol. In particular, the alcohol is selected from the group comprising MeOH, EtOH, ethylene glycols, propylene glycols and combinations thereof. The alcohol may also optionally be present in the solvent.

The solvent preferably comprises at least one compound from the group comprising alcohols, aliphatics and aromatics, wherein the compound has 1 to 20, preferably 1 to 12, particularly preferably 1 to 9 carbon atoms. The aromatics may be substituted or unsubstituted. Preference is given to toluene. The aliphatics are preferably acyclic compounds, particularly n-alkanes or isoalkanes. These may be present as pure substances or isomeric mixtures.

Phase separation is used to separate the (preliminary) siloxane obtained by cohydrolysis in step a) from an aqueous phase, optionally containing alcohol. For example, phase separation can be carried out using a separating funnel or a double column process with a coalescer.

Q/T/M siloxanes produced by cohydrolysis may have a high content of alkoxy groups. This may result in the products not being viscosity-stable when exposed to atmospheric moisture. The alkoxy content can be reduced by further chemical treatments. The siloxanes thus obtained are then viscosity-stable.

In step c), further treatment of the (preliminary) siloxane mixture separated from the aqueous phase is carried out either under acidic or basic catalysis. While acidic catalysis (in the presence of (functional) disiloxanes, halosilanes or silanols) converts the alkoxy groups to —O—Si(CH$_3$)$_2$R$^1$ functionalities, basic catalysis converts the alkoxy groups to silanols, which may either condense or be further functionalized.

In step d), low molecular weight constituents are separated, in particular by distillation, for example by means of distillation columns, thin film evaporators or short path evaporators.

The molar mass limit of the constituents to be separated depends on the conditions and compounds used. For example, methanol, ethanol, Si2 (formula A, if n=1), VSi2 [H$_2$C=C(H)Si(Me)$_2$—O—Si(Me)$_2$(C(H)=CH$_2$)], TM3 up to QM4 may be removed by distillation. A molar mass limit up to which compounds are separated is, for example, 1000 g/mol, preferably 500 g/mol, particularly preferably 400 g/mol (QM4=384.84 g/mol).

A further process variant for producing the siloxanes used comprises the following steps:
a) reacting a mixture comprising at least one silicon compound from the group comprising $SiX_4$, $Si(OR^2)_4$, $R^1SiX_3$, $R^1Si(OR^2)_3$, $R^3R^1SiX_2$ and $R^3R^1Si(OR^2)_2$, with a proportion of water that corresponds to less than 50% of the amount of alkoxy groups present in the mixture, optionally in the presence of an alcohol and/or solvent, where
X is each independently F, Cl, Br, I, tosylate, triflate or acetate and the radicals $R^1$, $R^2$ and $R^3$ are defined as described above;
b) reacting the reaction mixture obtained in step a) with an acidic catalyst in the presence of at least one silicon compound from the group comprising $R^1_3SiOSiR^1_3$, $R^1_3SiX$ and $R^1_3SiOH$;
c) carrying out a phase separation to separate off a siloxane phase;
d) removing low molecular weight constituents to obtain the siloxane.

The mixture in step a) preferably comprises at least one silicon compound from the group comprising $SiX_4$, $Si(OR^2)_4$, $R^1SiX_3$ and $R^1Si(OR^2)_3$.

The reaction in step a) is a cohydrolysis, where said reaction is carried out with a sub-stoichiometric amount of water and without the addition of M units. This variant (cf. FIG. 1, variant B) allows the specific adjustment of an average chain length in the form of oligomeric or polymeric alkoxysiloxanes. The addition of sub-stoichiometric amounts of water can minimize the risk of gelation, but requires chemical reduction of the alkoxy content by further treatment in step b), in which functionalities can also be selectively incorporated.

In step b), the reaction mixture is further treated under acidic catalysis. The alkoxy groups here are also converted to —O—Si(CH$_3$)$_2$R$^1$ functionalities.

With respect to the alcohol, the solvent and with regard to steps c) and d), reference can be made to the previous description.

Preferably, in both processes described above, R$^2$ is each independently an unsubstituted C$_1$-C$_{12}$-hydrocarbon radical, preferably a C$_1$-C$_6$-hydrocarbon radical, particularly preferably methyl or ethyl.

It may be preferred that in the variants A or B described above (cf. FIG. 1), R$^1$ is each independently methyl or phenyl, wherein between steps b) and c) or between steps c) and d) or after step d), an additional step i) is carried out, in which the mixture obtained in each case in the preceding step is reacted with a basic catalyst in the presence of at least one silicon compound from the group comprising [R$^3$Si(OR$^2$)$_3$], [R$^3$R$^1$Si(OR$^2$)$_2$] and [R$^3{}_3$Si(OR$^2$)]. R$^3$ is a radical of the general formula (II)

The radicals R$^4$, R$^5$ and R$^7$ are defined as follows:

R$^4$ is a divalent linear or branched hydrocarbon radical having 1 to 18 carbon atoms.

R$^5$ and R$^7$ are each independently H, an amino group, unsubstituted or substituted C$_1$-C$_{20}$-alkyl radical, unsubstituted or substituted C$_2$-C$_{20}$-alkenyl radical, unsubstituted or substituted C$_6$-C$_{14}$-aryl radical.

R$^6$ is a divalent hydrocarbon radical having 1 to 6 carbon atoms and the index g has the value 0, 1, 2, 3 or 4.

The general formula (II) is a specific selection from the already described general selection for R$^3$ (aminoalkyl radical).

This process variant (cf. FIG. 1, variant D) is a further post-treatment for introducing amino groups.

The basic catalyst is preferably selected from the group comprising alkali metal hydroxide, alkaline earth metal hydroxide, alkali metal alkoxide, alkaline earth metal alkoxide, alkali metal silanolate, alkaline earth metal silanolate, amines, aminoalkoxysilanes and mixtures thereof. The amines are preferably alkylamines (for example triethylamine), aminosilanes and/or aminoalkoxysilanes (for example aminopropylsilanes, aminoethylsilanes).

It may also be preferred that R$^1$ is each independently methyl or phenyl, wherein between steps b) and c) or between steps c) and d) or after step d), an additional step ii) is carried out, in which the mixture obtained in each case in the preceding step is reacted with an acidic catalyst in the presence of at least one silicon compound from the group comprising R$^3{}_3$SiOSiR$^3{}_3$, R$^3{}_3$SiX and R$^3{}_3$SiOH. R$^3$ is each independently an unsubstituted C$_2$-C$_{20}$-alkyl radical, unsubstituted or substituted C$_2$-C$_{20}$-alkenyl radical, unsubstituted or substituted C$_6$-C$_{14}$-aryl radical. R$^3$ is preferably a vinyl, allyl or hexenyl radical.

This variant (cf FIG. 1, variant C) is a post-treatment for introducing unsaturated, statistically distributed, functionalities.

Preferably, the acidic catalyst is selected from the group comprising hydrohalic acid, sulfonic acid, nitric acid, nitrous acid, sulfuric acid, organic acids, and mixtures thereof. The organic acids are preferably at least one compound from the group comprising acetic acid, trifluoroacetic acid, formic acid, propionic acid, oxalic acid, malonic acid, succinic acid, citric acid, malic acid, adipic acid and mixtures thereof.

The acidic and basic catalysts may in each case be bound to a support material or used as a liquid or gas. Examples of commercially available acidic catalysts are Tonsil (acidic alumina) or Purolite® CT269 DR (sulfonic acid).

Preferably, the reaction is carried out in the presence of an acidic or basic catalyst until thermodynamic equilibrium is established and the composition of the mixture no longer changes.

The reaction in the presence of an acidic or basic catalyst can be carried out at a temperature of 20 to 200° C., preferably 50 to 150° C., particularly preferably 80 to 120° C.

Process step a) can be carried out at a temperature of −20 to 200° C., particularly preferably 0 to 150° C., especially 20 to 120° C.

The process may be carried out as a batch process, semi-batch process or a continuous process.

In principle, the process or individual process steps can be carried out independently of one another under reduced or elevated pressure. The pressure is preferably in a range of 1 to 10 000 kPa, particularly preferably in a range of 10 bar to 1000 kPa. In particular, the process is carried out at ambient pressure.

The siloxane produced as described meets the conditions according to Regulation (EC) No. 1907/2006 (REACH Regulation) to be classified as a polymer. Accordingly, the siloxanes have a molar mass distribution in which no individual component is present at a content greater than 50%. In addition, said siloxanes fulfil the so-called (3n+1) rule, according to which more than 50% of the molecules present in the siloxane have a chain length of ≥4, or have a chain length of at least 3 and are covalently bonded to a reactant.

The TM, QTM and QM siloxanes have physicochemical properties which, at the same viscosity at room temperature, differ significantly in some respects from the DM siloxanes (especially with respect to chain length, low-temperature viscosity and glass transition temperature), but are similar in other respects (refractive index, surface tension), as Table 1 shows.

TABLE 1

| Measured parameters* | DM Siloxane | TM Siloxane | QTM Siloxane | QM Siloxane |
|---|---|---|---|---|
| Viscosity at 25° C. [mPa · s] | 100 | 100 | 100 | 100 |
| Average chain length (Determined from M$_N$ by GPC) | 70 | 7 | 3-4 | 2-3 |
| Viscosity at −30° C. [mPa · s] | ~400 | ~11 000 | ~1400 | ~1200 |
| Glass transition temperature [° C.] | −125.6 | −79.1 | −94.5 | −119.1 |
| Surface tension [mN/m] | 20.5 | 20.1 | 19.8 | 19.1 |
| Density [g/l] | 0.963 | 1.026 | 1.015 | 0.941 |
| Refractive index | 1.401 | 1.407 | 1.404 | 1.402 |

*Unless otherwise stated, the measured parameters refer to 25° C. The QTM siloxane consists of equimolar parts of Q and T units.

Depending on the choice of functional groups, the siloxanes can be used in a wide range of applications as substitutes for polydimethylsiloxanes, D-based vinyl polymers and D-based amine oils.

Polydimethylsiloxane substitutes can be used as a damping medium, hydraulic oil, liquid dielectric (e.g. as transformer fluid), hydrophobizing agent (especially in the car care and textile sectors), antifoaming agent, care additive (both in the personal and household care sectors), lubricant, release agent, plasticizer or heat transfer fluid in the low-temperature range.

The substitutes for D-based vinyl polymers can be used for coating compositions (for example paper coatings), as controlled-release additives, as components in the production of elastomers, or as starting materials for further functionalizations via hydrosilylations and epoxidations.

The substitutes for D-based amine oils can be used in the fields of car care products, release agents, textiles, personal/household care and in building protection.

Figure 1:
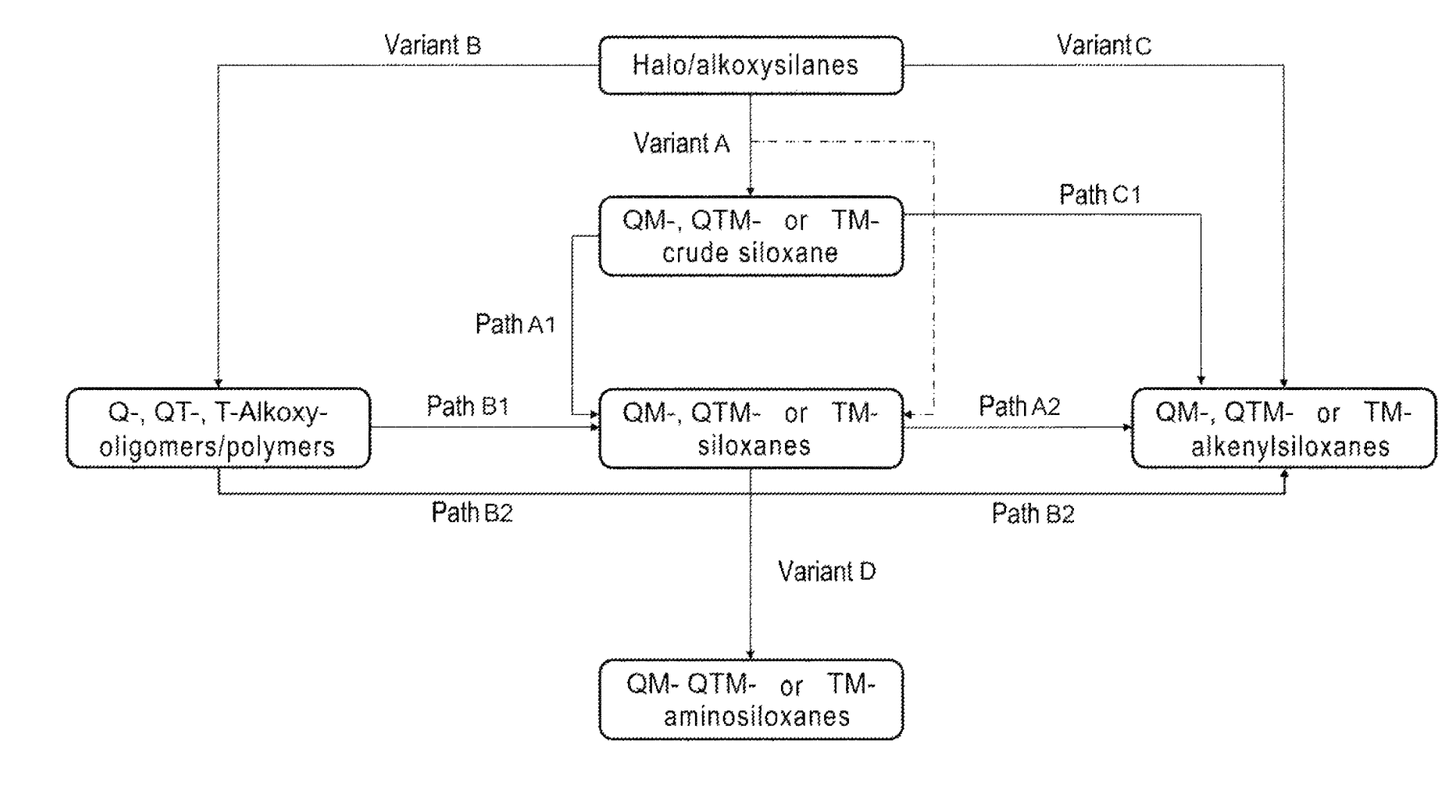
FIG. 1 is a schematic view of different process variants for producing D-cycle-free siloxanes according to an embodiment of the present invention.

FIG. 1 shows a scheme of the different process variants for producing D-cycle-free siloxanes.

EXAMPLES

Reagents

Tetrachlorosilane (CAS: 10026-04-7), trichloromethylsilane (CAS: 75-79-6), chlorotrimethylsilane (CAS: 75-77-4), trimethoxymethylsilane (CAS: 1185-55-3), tetramethoxysilane (CAS: 681-84-5), hexamethyldisiloxane (CAS: 107-46-0), 1,1,3,3-dimethyl-1,3-divinyldisiloxane (CAS: 2627-95-4), 3-aminopropyltrimethoxysilane (CAS: 13822-56-5) and N-(2-aminoethyl)-3-aminopropyltrimethoxysilane (AS1, CAS: 1760-24-3) were purchased from Sigma-Aldrich. Tonsil® was purchased from Clariant and Purolite® CT269 DR was purchased from Purolite.

Measurement Methods

1) The viscosity was measured at 25° C. and in a temperature range of −40 to 90° C. using a Stabinger SVM3000 rotational viscometer from Anton Paar.
2) The mass-average molar mass MW and also the number-average molar mass $M_n$ can be determined by size exclusion chromatography (SEC) against polydimethylsiloxane standards, in toluene, at 35° C., flow rate 0.7 ml/min and detection by RI (refractive index detector) on a MesoPore-OligoPore column set (Agilent, Germany) with an injection volume of 10 µl.
3) The proportion of Q, T and M units in the siloxane mixture was determined by nuclear magnetic resonance spectroscopy ($^{29}$Si-NMR; Bruker Avance III HD 500 ($^{29}$Si: 99.4 MHz) spectrometer with BBO 500 MHz S2 probe head; inverse gated pulse sequence (NS=3000). 150 mg of Q/T/M siloxane mixture were taken up in 500 µl of a 4*10-2 molar solution of Cr(acac)$_3$ in CD$_2$Cl$_2$. The proportion of other functionalities was determined by correlating the $^{29}$Si-NMR data with the integrals from the $^1$H-NMR spectrum ($^1$H-NMR; Bruker Avance III HD 500 ($^1$H: 500.2 MHz) spectrometer with BBO 500 MHz S2 probe head). 50 mg of Q/T/M siloxane mixture were taken up in 500 µl of CD$_2$Cl$_2$.
4) The alkoxy content was determined by a combination of $^{29}$Si— and $^1$H-NMR spectroscopy (cf. Point 3). From the $^{29}$Si-NMR spectra, the percentages of Q, T and M units can be determined. Taking into account any signal overlaps (for example the Si-Me units of MeSiO$_{3/2}$ groups or Me$_3$SiO$_{1/2}$ groups) the relative ratios from the $^{29}$Si-NMR spectrum can be assigned to the ratios from the $^1$H-NMR spectrum. In this manner, the relative proportion of all functionalities (Q, T, M units, alkoxy groups, unsaturated functionalities, amine functionalities, etc.) was determined. The relative proportions of the observed species are multiplied by the respective molar masses of the associated fragments. The individual masses determined in this way are set in relation to the sum of all individual masses. The individual mass of the alkoxy groups in relation to the sum of all individual masses, multiplied by a factor of 100, gives the alkoxy content of the sample in percent by weight.
5) The average empirical formula was determined by a combination of NMR spectroscopy (cf. Point 3) and gel permeation chromatography (GPC, cf. Point 2). From the $^{29}$Si-NMR spectra, the relative molar proportions of Q, T and M units can be determined. Taking into account any signal overlaps (for example the Si-Me units of MeSiO$_{3/2}$ groups or Me$_3$SiO$_{1/2}$ groups) the relative ratios from the $^{29}$Si-NMR spectrum can be assigned to the ratios from the $^1$H-NMR spectrum. In this manner, the relative proportion of all functionalities (Q, T and M units, alkoxy groups, unsaturated functionalities, amine functionalities, etc.) was determined. The relative proportions thus obtained are referred to as the relative empirical formula. The relative proportions of the observed species are multiplied by the respective molar masses of the associated fragments. The total mass thus obtained is referred to as the relative total mass. According to point 2, the number-average molar mass $M_N$ of the sample to be analyzed was determined by GPC. The factor necessary to convert the relative molar mass to the number-average molar mass is then determined. The relative proportions are multiplied by this factor. In this way, the relative empirical formula is converted to the average empirical formula.
6) The content of unsaturated functionalities in the Q/T/M-based vinyl polymer substitutes is given by the iodine number according to Wijs. The measurement is carried out according to DIN 53241.
7) The amine number indicates how many mmol of KOH are equivalent to one gram of the substance to be determined. The amine number is determined according to DIN 16945 Version 1989-03.
8) The content of D-cycles is determined using a gas chromatograph with a flame ionization detector (GC-FID) (CES-Silicones Europe, Apr. 16, 2013 (Revised Version: Jan. 10, 2019)). The detection limit here is typically 60 ppmw.
9) The silanol group content can be determined by titration with 0.1N sodium hydroxide solution in saturated saline (Sears et al., Anal. Chem. 1956, 12. 1981). In the case of silicas, the sorption capacity for hydroxyl ions (OH$^-$) is generally recorded. The relative sorption capacity can then be defined as the sorption capacity of the silica under study divided by the sorption capacity of the hydrophilic starting silica multiplied by 100.
10) The carbon content is determined in the oxygen flow at temperatures >1000° C., where the carbon content is determined from the combustion gases by means of a microprocessor (CS 530, Eltra or SC144DR, Leco).
11) The content of volatile components of the functionalized silica is determined at 105° C. and 300° C. in accordance with DIN ISO 787/2. 12) The thickening effect of the functionalized silicas is determined at 25° C. in a polyester resin using a rotational viscometer according to DIN 53019.

Examples 1 to 3: Production of D-Cycle-Free Hydrophobic Silicas by Functionalizing Fumed Silicas with T/M Siloxane Three fumed silicas (HDK® V15A, HDK® N20, HDK® T30, Wacker Chemie AG) were used, the properties of which are shown in Table 2. For the functionalization, a T/M siloxane (S250) was used having a viscosity of 250 mPa*s and a residual methoxy content of 0.03% by weight.

TABLE 2 silicas and siloxane used

| Ex. No. | Silica | Surface area Silica [m²/g] | Mass S250 [g] |
|---|---|---|---|
| 1 | HDK ® V15A | 150 | 18 |
| 2 | HDK ® N20 | 200 | 32 |
| 3 | HDK ® T30 | 300 | 48 |

General Experimental Setup for Functionalization:

In a 6 L reactor (quartz glass) equipped with stirrer, 100 g of the silica were fluidized under protective gas (argon) for 15 min at 800 rpm. At unchanged rotational speed, the T/M siloxane (S250) was fed from above via a gyro mist nozzle (model 121, bore 0.2 mm, 30° cone, Schlick) using a gear pump (MCP-Z, Ismatec, Z-1830 pump head), over 15 min in a nitrogen flow against 0.6 MPa. After 15 minutes homogenization, the reactor was heated to 300° C. and this temperature was maintained for 2 h with a jacket heater. For the last 30 minutes of the heating period, the system was switched from argon blanketing to nitrogen purging (100 L/h) to expel volatile components via a riser tube.

The functionalized silicas obtained were analyzed for the carbon content thereof, the volatile fractions at 105° C. and at 300° C. and also residual silanol content and thickening effect in polyester resin (rheological properties). The results are compiled in Table 3.

TABLE 3

Analytical results of functionalized silicas

| Ex. No. | Volatiles 105° C. [%] | Volatiles 300° C. [%] | Carbon content [%] | Residual silanol content [%] | Thickening effect polyester resin [mPas] |
|---|---|---|---|---|---|
| 1 | 0 | 1.1 | 3.4 | 17.6 | 7 |
| 2 | 0.2 | 5.5 | 6.5 | 19.3 | 8.7 |
| 3 | 0.3 | 7.5 | 8.4 | 21.0 | 6.1 |

Rheological properties were tested by dispersing the functionalized silica in epoxy resin. After storage for one day, the viscosity of the mixture is determined at a shear rate of 0.1 s⁻¹ and 10 s⁻¹ and 25° C. Dividing the low shear viscosity by the high shear viscosity gives the thixotropy index. The thixotropy index was determined for two epoxy resin systems:

Epoxy Resin System 1:

Mixture of 8 mol % of the functionalized silica and 92 mol % epoxy resin (Epikote™ Resin 828 (epoxy resin based on bisphenol A and epichlorohydrin), Hexion).

Epoxy Resin System 2:

Mixture of 8 mol % of the functionalized silica (according to Ex. 1-3) in epoxy resin (Epikote™ Resin 828) and 4 mol % HDK® N20 (fumed silica having a specific surface area of 200 m²/g) in amine hardener (Epikure™ curing agent MGS® RIMH-137, Hexion), the mixing ratio being 79 mol % epoxy resin to 21 mol % amine hardener. For comparison, a conventional, commercially available, functionalized silica (HDK® H17) was investigated. The thixotropy indices of the functionalized silicas are shown in Table 4.

TABLE 4

Rheological testing

| Ex. No. | Thixotropy index in epoxy resin system 1 | Thixotropy index in epoxy resin system 2 |
|---|---|---|
| 1 | 34 | 48 |
| 2 | 42 | 56 |
| 3 | 34 | 54 |
| HDK ® H17 | 40 | 52 |

The silicas modified according to the invention have shear thickenings comparable to the commercial product HDK® H17.

D-cycles could not be detected for any of the functionalized silicas according to Examples 1 to 3. Analysis of the comparative silica HDK® H17 showed 220 ppm D5 and 70 ppm D6.

Examples 4 to 6: Production of D-Cycle-Free Partially Hydrophobic Silicas by Functionalizing Fumed Silicas with T/M Siloxane The three fumed silicas used were HDK© V15A, HDK© N20, HDK® T30 (Wacker Chemie AG), the properties of which are shown in Table 5. Functionalization was carried out with T/M siloxane S250.

TABLE 5 silicas and siloxane used

| Ex. No. | Silica | Surface area Silica [m²/g] | Mass S250 [g] |
|---|---|---|---|
| 4 | HDK ® V15A | 150 | 7.5 |
| 5 | HDK ® N20 | 200 | 13 |
| 6 | HDK ® T30 | 300 | 19.5 |

The experimental setup and implementation were analogous to Examples 1 to 3.

The functionalized silicas obtained were analyzed with respect to the carbon content thereof, the volatile fractions at 105° C. and at 300° C. and residual silanol content thereof and the thickening effect in polyester resin (rheological properties). The results are compiled in Table 6.

TABLE 6

Analytical results of functionalized silicas

| Ex. No. | Volatiles 105° C. [%] | Volatiles 300° C. [%] | Carbon content[%] | Residual silanol content [%] | Thickening effect polyester resin [mPas] |
|---|---|---|---|---|---|
| 4 | 0.3 | 1 | 1.9 | 35.2 | 3.6 |
| 5 | 0.3 | 0.8 | 3 | 29.5 | 5.2 |
| 6 | 0.4 | 6.4 | 4.4 | 40.3 | 4.8 |

The synthesis of the D-cycle-free T/M siloxane S250 used for functionalization was carried out in a 4 L three-neck flask equipped with a KPG stirrer, 1 L dropping funnel and olive. The flask is connected to 2 safety wash bottles and an exhaust gas wash bottle filled with a 25% aqueous NaOH solution. Before filling the apparatus, it is flushed with argon. A mixture of 1089 g of methanol and 592 g of hexamethyldisiloxane is initially charged in the flask and cooled to 0° C. At this temperature, a total of 1335 g of methyltrichlorosilane is added via the dropping funnel over a period of 4 h, and the mixture is heated to 50° C. At this temperature, 602 g of demineralized water are added over a period of 3 h via the dropping funnel. The mixture is then brought to room temperature (RT) and stirred for 10 h. The siloxane phase is separated from the aqueous methanolic phase using a separating funnel, neutralized with a saturated sodium hydrogen carbonate solution and dried over sodium sulfate. After filtration (pleated filter), most of the low molecular weight constituents are removed on a rotary evaporator at 80° C. and 10 mbar. The material obtained is a colorless liquid having a viscosity of 64 mPa*s and a residual methoxy content of 0.03% by weight. Subsequently, further low molecular weight constituents (esp. TM3) are removed on a laboratory thin-layer evaporator at 160° C. and 10 mbar. The product obtained is a colorless liquid having a viscosity of 250 mPa*s and a residual methoxy content of 0.03% by weight.

Production of Further D-Cycle-Free Siloxanes: General Apparatus Setup for Cohydrolysis of Halosilanes and Alkoxysilanes A 4 L three-necked flask is equipped with a KPG stirrer, a 1 L pressure-equalizing dropping funnel and an olive. For variants A, B and C, the flask is connected to two safety wash bottles and an exhaust gas wash bottle filled with NaOH. Reactive reagents and solvents (for example hexamethyldisiloxane and methanol) are initially charged in the flask, unless described otherwise. Prior to filling the apparatus with the appropriate chlorosilanes, the entire apparatus is flushed with argon.

FIG. 1 shows the various process variants by means of a flow diagram. The underlying reaction setup for carrying out the process variants is first described below in general terms. Elucidation of variants A, B, C and D then follows.

Choice of Reactants

Halosilanes, alkoxysilanes, disiloxanes or mixtures thereof may be used as reactants for variant A. For variant C, at least one vinylhalosilane, vinylalkoxysilane or vinyldisiloxane is also added to this mixture. For variant B, the use of M sources is omitted in the hydrolysis. In variants A and C, an excess of water is used, based on the amount of water required to hydrolyze all alkoxy and halogen functionalities present in the mixture. In variant B, a deficiency of water is used.

The cohydrolyses (variant A, B or C) can be carried out starting from chlorosilanes or methoxysilanes or mixtures thereof. After cohydrolysis, phase separation is carried out in the A and C variants. The siloxane phase is then neutralized, dried over sodium sulfate for 2 h and isolated by filtration. In variant B, the hydrolysis product is used without further processing.

The products of variants A and B are generally characterized by a residual alkoxy content of >3% by weight. This can be reduced by post-treatments (paths A1, B1, B2, C1). If, after variant A or C, the residual alkoxy content is already in the desired range, no post-treatment is carried out.

Post-Treatment with Purolite® CT269 DR (in the Presence of a (Optionally Functionalized) Disiloxane: Paths A1, A2, B1, B2 and C1)

A 1 L single-necked flask (equipped with a reflux condenser) is filled with the siloxane to be treated, 7% by weight Purolite® CT269 DR (based on the siloxane weight), and 10-fold the molar amount of hexamethyldisiloxane, 1,1,3,3-dimethyl-1,3-divinyldisiloxane or mixtures thereof (based on the residual alkoxy content present in the siloxane). The mixture is heated to 100° C. for 2 h with intensive stirring, brought to RT and then isolated using a pleated filter (for low-viscosity siloxanes) or glass filter or glass frits with suction flask (for high-viscosity siloxanes). For siloxanes with high residual alkoxy content (from 15 to 30 mol %) after cohydrolysis, the catalyst content may be increased to 14% by weight. This post-treatment can reduce the content of TM, QTM- and QM-cycles in the siloxanes.

Post-Treatment with Tonsil© (in the Presence of a (Optionally Functionalized) Disiloxane; Paths A1, A2, B1, B2 and C1)

A 1 L three-necked flask (equipped with a reflux condenser) is filled with the siloxane to be treated, 10% by weight Tonsil© (based on the siloxane weight), and 10-fold the molar amount of hexamethyldisiloxane, 1,1,3,3-dimethyl-1,3-divinyldisiloxane or mixtures thereof (based on the residual alkoxy content present in the siloxane). The mixture is heated to 100° C. for a total of 12 h with stirring, brought to RT and then isolated using a pleated filter (for low-viscosity fluids) or glass filter or glass frits with suction flask (for high-viscosity fluids).

Post-Treatment with HCl (in the Presence of a (Optionally Functionalized) Disiloxane; Paths A1, A2, B1, B2 and C1)

To a stainless steel autoclave (1 L total volume, with analog and digital pressure transducer and resistance jacket heater with temperature sensor) are added 600 mL of a mixture of the siloxane to be treated and 10-fold the molar amount of hexamethyldisiloxane, 1,1,3,3-dimethyl-1,3-divinyldisiloxane or mixtures thereof (based on the residual alkoxy content present in the siloxane). The autoclave is sealed gas-tight and degassed (20 mbar for 3 min) and filled with 15 g of hydrogen chloride gas. The autoclave is heated to 100° C. for 3 h and then brought to RT. The gas atmosphere is passed through a gas scrubber and the gas chamber is purged with argon for 5 min. The siloxane phase is separated from the alcoholic phase, neutralized, and dried over sodium sulfate for 2 h and filtered.

Post-Treatment with KOH (Path A1)

A 1 L single-necked flask (equipped with a reflux condenser) is filled with the siloxane to be treated and an equimolar amount of KOH granules (based on the residual alkoxy content present in the siloxane). The mixture is heated to 100° C. with stirring for 2 h and then brought to RT. The silicone phase is neutralized with hydrochloric acid (1 mol/l) and freed from adhering solids by filtration. The siloxane phase is washed with demineralized water and then dried over sodium sulfate for 2 h. This post-treatment can be used in particular to reduce the cycle content of Q/T/M siloxanes. Materials subjected to this post-treatment have a residual hydroxy content even after neutralization, which results in increasing viscosities with increasing storage time. In order to obtain viscosity-stable materials, post-treatment with an acidic catalyst can then be carried out as described. The viscosity changes in the siloxane due to this post-treatment can be significant, and, in the case of TM siloxanes, restructuring is usually detectable.

After each of the aforementioned reaction steps, low molecular weight constituents such as methanol, ethanol, hexamethyldisiloxane, tetrakis(trimethylsiloxy)silane (QM4) such as tris(trimethylsiloxy)methylsilane (TM3) can be quantitatively removed on a rotary evaporator or thin film/short path evaporator.

Treatments with NaOMe in the Presence of an Aminoalkoxysilane (Variant D)

In a 1 L round-necked flask with reflux condenser, the siloxane to be treated is mixed with an aminoalkoxysilane and 500 ppm by weight (based on the total weight) of a sodium methoxide solution (20% by weight in methanol). The mixture is heated to 90° C. with stirring for 2 h. The reaction is monitored by $^{29}$Si-NMR spectroscopy.

Reaction Sequences

After cohydrolysis (according to variant A), crude siloxanes are obtained having a residual alkoxy content. If this is outside the desired range, it can be reduced by post-treatments using an acidic or basic catalyst (path A1). If the residual alkoxy content is already in the desired range, no post-treatment is carried out.

The siloxanes can be converted in subsequent steps to alkenylsiloxanes (post-treatment with an acidic catalyst using, for example, 1,1,3,3-tetramethyl-1,3-divinyldisiloxane, path A2) or aminosiloxanes (post-treatment with NaOMe in the presence of an aminoalkoxysilane). Furthermore, the incorporation of unsaturated functionalities can be coupled with the reduction of the residual alkoxy content (path C1).

After partial hydrolysis according to variant B, Q-, QT- or T-alkoxy oligomers/polymers are obtained; M units are not used in the hydrolysis. In the context of post-treatment with an acidic catalyst using, for example, hexamethyldisiloxane (path B1), 1,1,3,3-dimethyl-1,3-divinyldisiloxane or mixtures thereof (path B2), the (alkenyl)siloxanes are produced.

A summary of the reactants used in the examples and weights thereof for producing the crude siloxanes (without vinyl or amine functionalities) is given in Table 8.

TABLE 8

| Ex | Weight of alcohol [g] | Weight of [Me$_3$SiO$_{1/2}$] source [g] | Weight of [MeSiO$_{3/2}$] source [g] | Weight of [SiO$_{4/2}$] source [g] | Weight of demin. water [g] | Temp. A and B [° C.] |
|---|---|---|---|---|---|---|
| 7 | EtOH, 756 | Me$_3$SiCl, 254 | MeSiCl$_3$, 582 | — | 252 | 0; RT |
| 8 | MeOH, 1027 | [Me$_3$SiO$_{1/2}$]$_2$, 568 | MeSiCl$_3$, 1281 | — | 577 | 0; 50 |
| 9 | MeOH, 1001 | [Me$_3$SiO$_{1/2}$]$_2$, 785 | MeSiCl$_3$, 506 | SiCl$_4$, 581 | 563 | 0; 50 |
| 10 | MeOH, 1254 | [Me$_3$SiO$_{1/2}$]$_2$, 983 | MeSiCl$_3$, 633 | SiCl$_4$, 727 | 705 | 0; 50 |
| 11 | MeOH, 1013 | [Me$_3$SiO$_{1/2}$]$_2$, 1064 | — | SiCl$_4$, 958 | 570 | 0; 50 |
| 12 | MeOH, 1091 | [Me$_3$SiO$_{1/2}$]$_2$, 942 | — | SiCl$_4$, 1084 | 613 | 0; 50 |
| 13 | — | [Me$_3$SiO$_{1/2}$]$_2$, 72 | MeSi(OMe)$_3$, 500 | — | 80 (+54 g HCl)* | 50 |
| 14 | — | — | MeSi(OMe)$_3$, 1500 | — | 245 (+15 g HCl)* | 50 |
| 15 | MeOH, 1089 | [Me$_3$SiO$_{1/2}$]$_2$, 592 | MeSiCl$_3$, 1335 | — | 601 | 0; 50 |
| 16 | — | — | MeSi(OMe)$_3$, 1500 | — | 220 (+6 g HCl)* | 50 |
| 17 | MeOH, 1088 | [Me$_3$SiO$_{1/2}$]$_2$, 853 | MeSiCl$_3$, 550 | SiCl$_4$, 631 | 612 | 0; 50 |
| 18 | MeOH, 1070 | [Me$_3$SiO$_{1/2}$]$_2$, 1085 | — | SiCl$_4$, 1022 | 601 | 0; 50 |

*Conc. hydrochloric acid (32% by weight) was used as acid. Acid and demineralized water were mixed prior to adding and homogenized by intensive stirring for 5 minutes.

A summary of the analytical data of the siloxanes before and after post-treatment can be found in Table 9.

TABLE 9

| Ex. | Viscosity of crude siloxane [mPa*s] | Residual alkoxy content of crude siloxane [wt. %] | Post-treatment | Viscosity of product [mPa*s] | Residual alkoxy content [wt. %] |
|---|---|---|---|---|---|
| 7 | — | — | — | 154 | 0.23 |
| 8 | 127.2 | 1.6 | Purolite/Si2 | 1281 | 0.05 |
| 9 | 68.1 | 4.8 | Purolite/Si2 | 184 | 0.22 |
| 10 | 573.5 | 2.8 | KOH | 14012 | 0.96 |
| 11 | 51.1 | 3.2 | Purolite/Si2 | 187 | 0.33 |
| 12 | 1956.7 | 4.8 | Purolite/Si2 | 21326 | 0.73 |
| 13 | — | — | Purolite/Si2 | 7501 | 0.18 |
| 14 | — | — | Purolite/Si2 | 9720 | 0.72 |
| 15 | — | — | Purolite/Si2 | 138 | 0.08 |
| 16 | — | — | Purolite/Si2 | 980 | 0.58 |
| 17 | — | — | Tonsil/Si2 | 150 | 0.52 |
| 18 | — | — | Purolite/Si2 | 80 | 0.19 |
| 19* | — | — | HCl/Si2 | 175 | <0.01 |

*For Example 19, the non-post-treated crude siloxane from Example 17 was used and reacted with HCl as catalyst according to the above procedure.

A summary of the weights and analytical data of the siloxanes after functionalization can be found in Table 10.

TABLE 10

| Ex. | Siloxane [Ex.] | Weight of siloxane [g] | Reagent [g] | Cat. [g] | Viscosity [mPa*s] | Residual alkoxy content [wt. %] | Iodine No. | Amine No. [meq/g] |
|---|---|---|---|---|---|---|---|---|
| 20 | 15 | 251 | VSi2, 14.5 | Purolite, 20 | 179 | <0.01 | 7.4 | — |
| 21 | 16 | 265 | VSi2, 49.1 | Purolite, 13 | 1081 | 0.04 | 15.4 | — |
| 22 | 17 | 300 | VSi2, 17.1 | Purolite, 21 | 290 | 0.06 | 6.8 | — |
| 23 | 18 | 352 | VSi2, 40.2 | Purolite, 27 | 145 | 0.82 | 6.6 | — |
| 24 | 13 | 738 | AS1, 11.5 | NaOMe* | 6871 | 0.65 | — | 0.12 |
| 25 | 16 | 1296 | AS1, 42.6 | NaOMe* | 856 | 1.64 | — | 0.28 |

*The catalyst addition of the NaOMe solution (20% by weight in MeOH) was 500 ppm by weight (based on the total mass of base siloxane and aminosilane).

For examples 7 to 25, the D-cycle content was investigated by GC-FID, with the result that no D-cycles could be detected.

The invention claimed is:

1. A fumed silica functionalized with a siloxane of the general formula (I)

$$[SiO_{4/2}]_a[R^1SiO_{3/2}]_b[R^3R^1SiO_{2/2}]_c[R^1_3SiO_{1/2}]_d[O_{1/2}R^2]_e \quad (I)$$

where the indices a, b, c, d, e each independently have integer values
a from 0 to 100,
b from 0 to 100,
c from 0 to 50,
d from 3 to 200,
e from 0 to 50,
with the proviso that the sum of a, b and c is at least 1 and for more than 50% of the siloxanes in the mixture the sum of a, b and c is ≥4;
where $R^1$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical;
where $R^2$ is each independently H, an unsubstituted or substituted $C_1$-$C_{20}$-hydrocarbon radical;
where $R^3$ is each independently H, an amino group, unsubstituted or substituted $C_2$-$C_{20}$-alkyl radical, unsubstituted or substituted $C_2$-$C_{20}$-alkenyl radical, unsubstituted or substituted $C_6$-$C_{14}$-aryl radical, wherein substituted signifies that independently of one another at least one substituent is present from the group of $OR^Y$, —$NR^Y_2$, —$SR^Y$, epoxy, —$COOR^Y$, —CHO, —CN, —NCO, —$OCOOR^Y$, —$NR^Y$—$COOR^Y$, —$NR^Y$—CO—$NR^Y$, —$SiR^Y_3$ and —$OSiR^Y_3$, where $R^Y$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical.

2. The fumed silica as claimed in claim 1, wherein the indices a, b, c, d, e each independently have integer values
a from 0 to 30,
b from 0 to 30,
c from 0 to 15,
d from 3 to 60,
e from 0 to 15.

3. The fumed silica as claimed in claim 1, wherein the value of the index a and/or the index c is equal to 0.

4. The fumed silica as claimed in claim 1, wherein the content of cyclic D-siloxanes is selected from the group consisting of hexamethylcyclotrisiloxane (D3, [Me$_2$SiO$_{2/2}$]$_3$), octamethylcyclotetrasiloxane (D4, [Me$_2$SiO$_{2/2}$]$_4$), decamethylcyclopentasiloxane (D5 or [Me$_2$SiO$_{2/2}$]$_5$) and dodecamethylcyclohexasiloxane (D6 or [Me$_2$SiO$_{2/2}$]$_6$) and higher homologs is less than 250 ppmw.

5. A process for producing a functionalized fumed silica, wherein the process comprises reacting at a temperature of 25 to 400° C. an unfunctionalized fumed silica with a siloxane of the general formula (I)

$$[SiO_{4/2}]_a[R^1SiO_{3/2}]_b[R^3R^1SiO_{2/2}]_c[R^1_3SiO_{1/2}]_d[O_{1/2}R^2]_e \quad (I)$$

where the indices a, b, c, d, e each independently have integer values
a from 0 to 100,
b from 0 to 100,
c from 0 to 50,
d from 3 to 200,
e from 0 to 50,
with the proviso that the sum of a, b and c is at least 1 and for more than 50% of the siloxanes in the mixture the sum of a, b and c is ≥4;
where $R^1$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical;
where $R^2$ is each independently H, an unsubstituted or substituted $C_1$-$C_{20}$-hydrocarbon radical;
where $R^3$ is each independently H, an amino group, unsubstituted or substituted $C_2$-$C_{20}$-alkyl radical, unsubstituted or substituted $C_2$-$C_{20}$-alkenyl radical, unsubstituted or substituted $C_6$-$C_{14}$-aryl radical, wherein substituted signifies that independently of one another at least one substituent is present from the group of $OR^Y$, $-NR^Y_2$, $-SR^Y$, epoxy, $-COOR^Y$, $-CHO$, $-CN$, $-NCO$, $-OCOOR^Y$, $-NR^Y-COOR^Y$, $-NR^Y-CO-NR^Y$, $-SiR^Y_3$ and $-OSiR^Y_3$, where $R^Y$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical;

and wherein the alkoxy group content, $R^2 \neq H$, is less than 5 mol % and the silanol group content, $R^2=H$, is less than 500 ppm and the siloxane has a viscosity of 5 to 500 000 mPa*s, the viscosity being determined using a Stabinger rotational viscometer at 25° C. and in a temperature range from −40 to 90° C., the fumed silica having a siloxane of the general formula (I)

(I)

where the indices a, b, c, d, e each independently have integer values
a from 0 to 100,
b from 0 to 100,
c from 0 to 50,
d from 3 to 200,
e from 0 to 50,
with the proviso that the sum of a, b and c is at least 1 and for more than 50% of the siloxanes in the mixture the sum of a, b and c is ≥4;
where $R^1$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical;
where $R^2$ is each independently H, an unsubstituted or substituted $C_1$-$C_{20}$-hydrocarbon radical;
where $R^3$ is each independently H, an amino group, unsubstituted or substituted $C_2$-$C_{20}$-alkyl radical, unsubstituted or substituted $C_2$-$C_{20}$-alkenyl radical, unsubstituted or substituted $C_6$-$C_{14}$-aryl radical, wherein substituted signifies that independently of one another at least one substituent is present from the group of $OR^Y$, $-NR^Y_2$, $-SR^Y$, epoxy, $-COOR^Y$, $-CHO$, $-CN$, $-NCO$, $-OCOOR^Y$, $-NR^Y-COOR^Y$, $-NR^Y-CO-NR^Y$, $-SiR^Y_3$ and $-OSiR^Y_3$, where $R^Y$ is each independently H, an amino group, unsubstituted or substituted $C_1$-$C_{20}$-alkyl radical, unsubstituted or substituted $C_2$-$C_{20}$-alkenyl radical, unsubstituted or substituted $C_6$-$C_{14}$-aryl radical.

6. The process as claimed in claim 5, wherein the indices a, b, c, d, e each independently have integer values
a from 0 to 30,
b from 0 to 30,
c from 0 to 50,
d from 3 to 60,
e from 0 to 15.

7. The process as claimed in claim 5, wherein the value of the index a and/or the index c is 0.

8. The process as claimed in claim 5, wherein the siloxane is free from cyclic D-siloxanes selected from the group consisting of hexamethylcyclotrisiloxane (D3, $[Me_2SiO_{2/2}]_3$), octamethylcyclotetrasiloxane (D4, $[Me_2SiO_{2/2}]_4$), decamethylcyclopentasiloxane (D5 or $[Me_2SiO_{2/2}]_5$) and dodecamethylcyclohexasiloxane (D6 or $[Me_2SiO_{2/2}]_6$) and higher homologs.

9. The process as claimed in claim 6, wherein the ratio of the index d to the index b is 0.15 to 3.

10. The process as claimed in claim 6, wherein $R^2$ is each independently an unsubstituted $C_1$-$C_{12}$-hydrocarbon radical.

11. The process as claimed in claim 5, wherein the unfunctionalized silica has a surface area of 50 to 400 $m^2/g$.

12. The process as claimed in claim 6, wherein the reaction is carried out at a temperature of 200 to 400° C.

13. An additive for controlling the rheology of liquid and pulverulent systems of toners and developers comprising the fumed silica of claim 1.

* * * * *